United States Patent
Bashan et al.

(10) Patent No.: US 12,446,595 B2
(45) Date of Patent: Oct. 21, 2025

(54) NON-TOXIC PROTEINS AND OMEGA-3 FROM ALGAE AND METHOD OF MAKING SAME

(71) Applicant: Vaxa Technologies Ltd, Rosh Pina (IL)

(72) Inventors: Ohad Bashan, Sde Varburg (IL); Isaac Berzin, Jerusalem (IL)

(73) Assignee: VAXA TECHNOLOGIES LTD., Rosh Pina (IL)

( * ) Notice: Subject to any disclaimer, the term of this patent is extended or adjusted under 35 U.S.C. 154(b) by 623 days.

(21) Appl. No.: 17/614,823

(22) PCT Filed: May 27, 2020

(86) PCT No.: PCT/IL2020/050579
§ 371 (c)(1),
(2) Date: Nov. 29, 2021

(87) PCT Pub. No.: WO2020/240551
PCT Pub. Date: Dec. 3, 2020

(65) Prior Publication Data
US 2022/0256884 A1    Aug. 18, 2022

Related U.S. Application Data

(60) Provisional application No. 62/854,381, filed on May 30, 2019.

(51) Int. Cl.
*A23J 1/00* (2006.01)
*A23K 10/30* (2016.01)
(Continued)

(52) U.S. Cl.
CPC .............. *A23J 1/009* (2013.01); *A23K 10/30* (2016.05); *A23K 20/147* (2016.05);
(Continued)

(58) Field of Classification Search
CPC .... A23K 20/147; A23K 20/158; A23K 10/30; A23J 1/009; C12P 21/00; C12P 7/6427;
(Continued)

(56) References Cited

U.S. PATENT DOCUMENTS

| | | |
|---|---|---|
| 2011/0263886 A1 | 10/2011 | Kale |
| 2012/0238732 A1 | 9/2012 | Wang |
| 2014/0242238 A1 | 8/2014 | Kadam et al. |
| 2014/0243540 A1 | 8/2014 | Kadam et al. |
| 2017/0246229 A1 | 8/2017 | Zanella et al. |

FOREIGN PATENT DOCUMENTS

| | | |
|---|---|---|
| CN | 106701311 A | 5/2017 |
| KR | 0816896 | 3/2008 |
| WO | WO 2019/095280 | 5/2019 |

OTHER PUBLICATIONS

International Search Report for Application No. PCT/IL2020/050579, mailed on Aug. 12, 2020.
(Continued)

*Primary Examiner* — Vera Stulii
(74) *Attorney, Agent, or Firm* — PEARL COHEN ZEDEK LATZER BARATZ LLP

(57) ABSTRACT

Disclosed is a non-toxic omega-3 rich extract and non-toxic miscella and a method of producing same. The method may include obtaining an aqueous microalgae slurry comprising at least 65% water; mixing the aqueous microalgae slurry with ethanol for a predetermined duration; separating the aqueous microalgae slurry-ethanol mixture to liquids and miscella; and evaporating the water and the ethanol from the liquid to receive a liquid extract. In some embodiments, the miscella contains organic material and ash at an amount below 15 dry weight %.

10 Claims, 2 Drawing Sheets

(51) Int. Cl.
*A23K 20/147* (2016.01)
*A23K 20/158* (2016.01)
*A23L 33/12* (2016.01)
*A23L 33/195* (2016.01)
*C07K 1/14* (2006.01)
*C12P 7/6427* (2022.01)

(52) U.S. Cl.
CPC ............ *A23K 20/158* (2016.05); *A23L 33/12* (2016.08); *A23L 33/195* (2016.08); *C07K 1/145* (2013.01); *C12P 7/6427* (2013.01); *A23V 2002/00* (2013.01)

(58) Field of Classification Search
CPC ......... A23D 9/00; A23D 9/013; A23L 33/195; A23L 33/12; C07K 1/145; C12N 1/12; C11B 1/10
See application file for complete search history.

(56) References Cited

OTHER PUBLICATIONS

S Melanie et al, "Combination of cell disruption method and pH variation as pre-treatment for lipid extraction of Nannochloropsis sp"; IOP Conf. Ser.: Earth Environ. Sci. 404: Jan. 20, 2022, Research and Development Center for Marine and Fisheries Product Processing and Biotechnology, Ministry of Marine Affairs and Fisheries, Jakarta, Indonesia, 2020; doi:10.1088/1755-1315/404/1/012022.

Angelo P. Matos et al., "Disruption of *Nannochloropsis gaditana*(Eustigmatophyceae) Rigid Cell Wall by Non-Thermal Plasma Prior To Lipid Extraction And Its Effect On Fatty Acid Composition", vol. 36, No. 4, pp. 1419-1428, Oct.-Dec. 2019; dx.doi.org/10.1590/0104-6632.20190364s20190097.

Zhi Qu et al, "Hydrothermal cell disruption of Nannochloropsis sp. and its influence on lipid extraction", Algal Research vol. 35: pp. 407-415, Sep. 20, 2018; http://doi.org/10.1016/j.algal.2018.09.015.

NON-TOXIC PROTEINS AND OMEGA-3 FROM ALGAE AND METHOD OF MAKING SAME

CROSS-REFERENCE TO RELATED APPLICATIONS

This application is a National Phase Application of PCT International Application No. PCT/IL2020/050579, International Filing Date May 27, 2020, claiming the benefit of U.S. Patent Application No. 62/854,381, filed May 30, 2019, which are hereby incorporated by reference.

FIELD OF THE INVENTION

The present invention generally relates to methods of producing proteins and omega-3 from algae. More particularly, the present invention relates to method of producing low ash and toxic-solvent-free proteins and omega-3 from algae.

BACKGROUND OF THE INVENTION

Microalgae are known to be good sources for nutritive components such as, proteins and omega-3. Some algae, like *Nannochloropsis*, has polar (glycol- and phospho-) lipid Omega-3 structure, associated with high bioavailability. However, current extraction methods involve using dry (>35 dry weight % (DW %) solids) microalgae and extracting the nutritive components using toxic solvents. Commercially dried microalgae contain only residual extracellular water and therefore behave like solid mass. Most of the commonly permitted and used solvents, (e.g. Hexane, Isopropyl alcohol (Isopropanol), acetone and the like), are potentially toxic and should be removed from the final product to below a maximum residue level. As many of these solvents are removed from the extract by thermal conditions, it presents a challenge for Omega-3 rich extracts, as Omega-3 is thermally sensitive. Therefore, in the case of Omega-3 rich algal extraction, there is a potential risk of residual toxic solvents in the final products. These residual toxic solvents can be detected using standard methods such as, headspace gas chromatography (HS-GC). There are only few solvents that are considered as non-toxic thus, do not have any maximum residual level, for example, water, ethanol and supercritical $CO_2$. Water does not extract Omega-3 nutritive components from algae and supercritical $CO_2$ does not extract polar lipids.

*Nannochloropsis* is a type of microalgae that has a unique double-wall cell structure that makes extraction with most solvents inefficient, without costly cell disruption *Nannochloropsis* has very high nutritive value, since it includes components, such as, polar omega-3 and proteins. When extracting a solid (>35% dry weight (DW %)) mass of *Nannochloropsis*, the algae-solvent contact area is limited, resulting with inefficient extraction. In order to enhance the permeability of the solvent into the double-wall cell structure, additional solvent-permeability enhancer, such as diatomaceous earth is added to the *Nannochloropsis*. Adding the solvent-permeability enhancer results in a very high level (e.g., above 50 DW %) of ash in the residual protein-rich miscella left after the separation of the omega-3 rich liquids from the microalgae mixture, which makes it unusable to most feed and food applications. Natural biomass such as any type of algae has up to 15 DW % of ash. Biomass products with more than 15 DW % levels of ash are unusable to most feed and food applications.

Accordingly, there is a need for a method for producing non-toxic nutritive components from microalgae, suitable also for microalgae such as *Nannochloropsis* that on one hand may preserve the polar-lipid structure of its Omega-3 and on the other does not create a high-ash miscella.

SUMMARY OF THE DRAWINGS

Some aspects of the invention may be directed to a method of producing non-toxic proteins and omega-3 from algae. In some embolites, the method may include obtaining an aqueous microalgae slurry comprising at least 65% water; mixing the aqueous microalgae slurry with ethanol for a predetermined duration; separating the aqueous microalgae slurry-ethanol mixture to liquids and miscella; and evaporating the water and the ethanol from the liquid to receive a liquid extract. In some embodiments, the miscella contains organic material and ash at an amount below 15 dry weight %.

In some embodiments, the liquid extract may contain omega-3. In some embodiments, the liquid extract may contain more than 20 wt. % omega-3. In some embodiments, microalgae included in the aqueous microalgae slurry may contains less than 6 wt. % omega-3 and embodiments of the method may further include purifying the liquid extract with a solvent to reach a liquid extract that contains more than 20 wt. % omega-3.

In some embodiments, the miscella may contain at least 50 wt. % proteins. In some embodiments, the volume ratio between ethanol and microalgae slurry may be at least 5:1. In some embodiments, evaporating the water and the ethanol may include providing heat under vacuum atmosphere to first evaporate the ethanol and the water. In some embodiments, the heat is provided from thermal waste streams. In some embodiments, the heat is provided at a temperature range of 55° C.-65° C. In some embodiments, the vacuum is provided at 75-125 mbar.

Some additional aspects of the invention may be related to a non-toxic miscella, comprising organic material from which: at least 50 wt. % are proteins. In some embodiments, the non-toxic miscella may further include cellulose and less than 15 dry weight % ash.

Some additional aspects of the invention may be related to a non-toxic omega-3 rich extract that may include: at least 20 wt. % omega-3; and no residual toxic solvent. In some embodiments, the omega-3 is a polar omega-3.

BRIEF DESCRIPTION OF THE DRAWINGS

Figure 1:
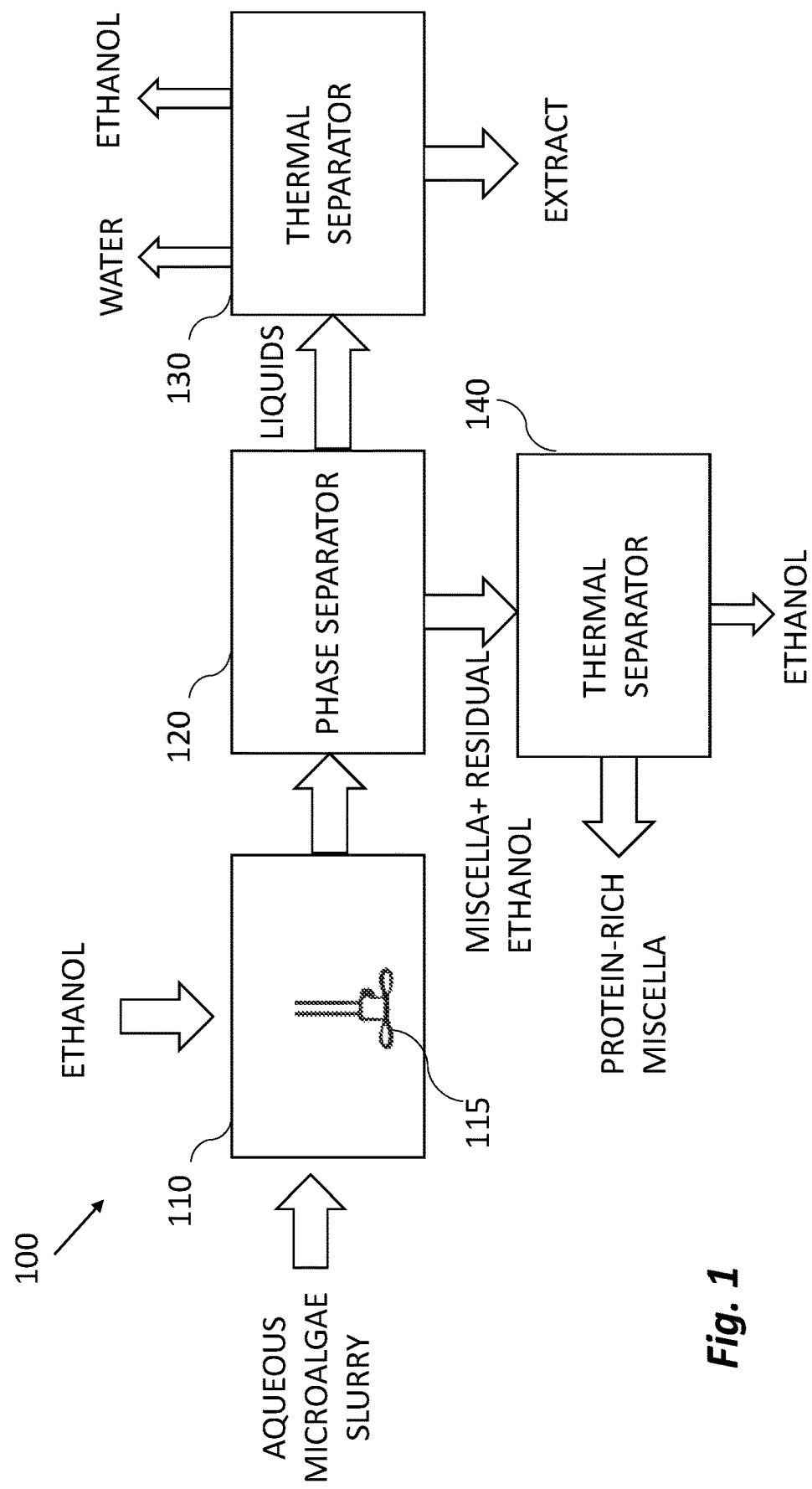
Figure 2:
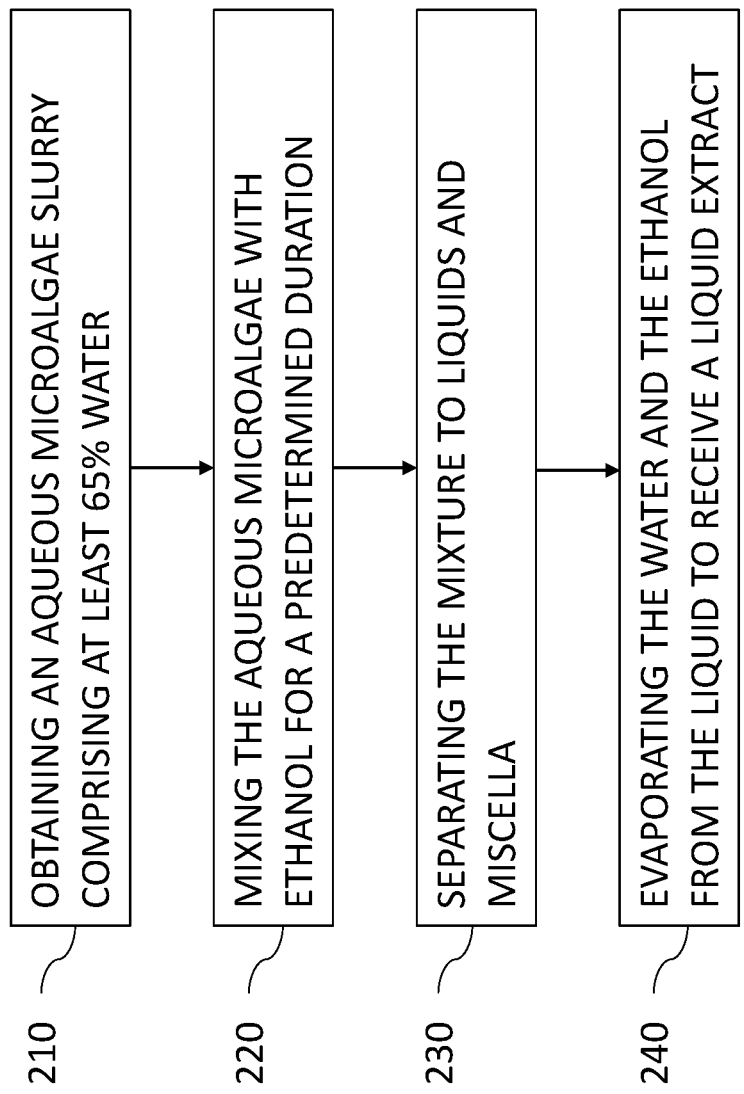

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a block diagram of a system for producing nutritive components from algae according to some embodiments of the invention; and FIG. 2 is a flowchart of a method of producing non-toxic proteins and omega-3 from algae according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Aspects of the invention may be directed to toxin free-nutritive components extracted from microalgae and a method of producing same. In some embodiments, such method may include using aqueous microalgae slurry (e.g., having above 65 wt. % water) as the raw material, eliminating the need to: dry the slurry first (as in other extraction methods), adding a permeability enhancer and mixing it with ethanol. In some embodiments, when the slurry contains at least 65 wt. % water the ethanol may be capable of diffusing into the cell structure of even the thickest microalgae cells (e.g., double-wall cell structure of *Nannochloropsis*) and extract the omega-3 out of the cell. In some embodiments, after separating the liquids from the solids, a solid miscella containing very high amount of proteins (e.g., above 50 wt. %) may be left. This miscella is also non-toxic, thus may be used as protein source or directly for animal feeding.

In some embodiments, after mixing the aqueous microalgae slurry and ethanol for a predetermined amount of time, the aqueous mixture may be separated (e.g., using a centrifuge) to liquids and solids (e.g., miscella). The liquids may further be separated using thermal separation methods, at a temperature below the omega-3 harmful temperature, to omega-3 rich extract, water and ethanol. The water and ethanol may be recycled. In some embodiments, the omega-3 rich extract may be non-toxic and may contain at least 20 wt. % omega-3. As used herein, the term non-toxic is related to a product that may not contain any potentially toxic solvents, even at allowable levels. A non-toxic product may contain only non-toxic components. In some embodiments, the miscella produced in the process may also be non-toxic as it may not contain any residual toxic solvent or solvent-permeability enhancers. Therefore, the miscella according to embodiments of the invention may contain less than 15 DW % ash.

Reference is now made to FIG. 1 which is a block diagram of a system for producing nutritive components from algae according to some embodiments of the invention. A system 100 may include a container 110 that may include a stirrer 115 for mixing and stirring aqueous microalgae slurry having at least 65 wt. % water and ethanol. Stirrer 115 may be any stirrer known in the art, for example, a mechanical stirrer, ultrasonic stirrer, and the like. System 100 may further include a phase separator 120 for separating the aqueous mixture into liquids and miscella. In some embodiments, after a predetermined stirring duration (e.g., 2 hours) in container 110 the aqueous mixture may be loaded into phase separator 120. Phase separator 120 may be, for example, a centrifuge (e.g., an explosion proof centrifuge).

In some embodiments, system 100 may further include a thermal separator 130. Thermal separator 130 may be configured to separate the liquid by evaporation into liquid extract (e.g., omega-3 reach extract), water and ethanol. The water and ethanol may be recycled for further use. The liquid extract may be collected and may further be used, as is, a nutritive additive. In some embodiments, the liquid extract may be a non-toxic omega-3 rich extract. In some embodiments, the omega-3 in the liquid extract may be a polar omega-3, for example, glycolipids, phospholipids and the like.

In some embodiments, thermal separator 130 may be heated by residual heat form geothermal power plants, or from any other heating source. In some embodiments, separator 130 may further include a vacuum pump for pumping the evaporated water and ethanol.

In some embodiments, the separated miscella may contain residual ethanol. Therefore, the separated miscella may be introduced into another thermal separator 140, for evaporating the residual ethanol. In some embodiments, the resulted miscella may be a non-toxic miscella that includes only organic material, for example, at least 50 wt. % proteins, cellulose and less than 15 DW % ash. In some embodiments, the ash in the miscella may be originated only from the microalgae (e.g., in amounts included in any dry biomass).

Reference is now made to FIG. 2 which is a flowchart of a method of producing low-ash and non-toxic proteins and omega-3 from algae according to some embodiments of the invention. In step 210, an aqueous microalgae slurry may be obtained. The aqueous microalgae slurry may include at least 65% water. For example, the aqueous microalgae slurry may be provided directly from the incubating containers of the microalgae to container 110 of system 100, such that no additional drying or preserving processes are needed.

In step 220, the aqueous microalgae slurry may be mixed with ethanol for a predetermined duration, for example, using stirrer 115. In some embodiments, the volume ratio between ethanol and microalgae slurry is at least 5:1, for example, at least 5 liters of ethanol may be added for each liter of microalgae slurry. In some embodiments, the ethanol and aqueous microalgae slurry may be stirred together for a predetermined duration in the range of 0.5-4 hours (e.g., 2 hours). In some embodiments, the predetermined duration may be determined based on at least one of: the type of the microalgae, the size and shape of container 110, the amount of slurry-ethanol mixture, the temperature of the mixture, the mixing rate and the like. In some embodiments, during the mixing, extract containing omega-3 and other nutritive elements may be extracted for the microalga cells, via the cells' membranes and may be dissolved in the water and ethanol in container 110. In some embodiments, due to the presence of at least 65 wt. % of water in the microalgae slurry, even a double-wall cell structure may be penetrated in the presence of ethanol.

In step 230, the aqueous microalgae slurry-ethanol mixture may be separated to liquids and miscella. For example, the aqueous microalgae slurry-ethanol mixture may be introduced to phase separator 120 to be centrifugally separated into mainly solid miscella and liquids. In some embodiments, the mainly solid miscella may include residual ethanol. The residual ethanol may be evaporated from the miscella using an additional separation step to receive a non-toxic miscella, that includes only organic material. The non-toxic miscella may include organic material from which at least 50 wt. % are proteins. In some embodiments, the toxin free miscella may further include cellulose and less than 15 DW % ash. Accordingly, a miscella according to embodiments of the invention may be used as a source for proteins for human consumption or as animals' food.

In step 240, the water and the ethanol may be evaporated from the liquid to receive a liquid extract. For example, the liquid may be introduced to thermal separator 130 to allow the evaporation of first the ethanol and then the water. The evaporation may be assisted by providing heat under vacuum atmosphere to first evaporate the ethanol followed by evaporation of the water. In some embodiments, the heat may be provided at a temperature range of 55-65° C. In some embodiments, the vacuum may be provided at 75-125 mbar.

In some embodiments, each one of the evaporated ethanol and the evaporated water may be collected and recycled. In some embodiments, the final liquid extract may be toxin free. In some embodiments, the liquid extract may be an omega-3 rich extract containing at least 20 wt. % omega-3 with no toxic solvents. In some embodiments, the omega-3 may be a polar omega-3, for example, glycolipids, phospholipids and the like. In some embodiments, polar solvents like water and ethanol may be favorable for extracting polar elements such as polar omega-3.

In some embodiments, microalgae included in the aqueous microalgae slurry contains less than 6 DW % omega-3 and the method may further include purifying the liquid extract with a solvent to reach a liquid extract that contains more than 20 wt. % omega-3. In some embodiments, residual toxic solvent, such as, Hexane may be added to the extraction and distillation process.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of producing non-toxic proteins and omega-3 from microalgae, the method consisting of:
   obtaining an aqueous microalgae slurry comprising at least 65% water;
   mixing the aqueous microalgae slurry with ethanol for a predetermined duration, to yield an aqueous microalgae slurry-ethanol mixture, wherein the ethanol diffuses into the cell structure of the microalgae and extracts nutritive elements from the microalgae cells through the cell membranes without disrupting the cell membranes of the microalgae;
   separating the aqueous microalgae slurry-ethanol mixture, which includes the extracted nutritive elements, to liquids and miscella; and
   evaporating the water and the ethanol from the liquid to receive a liquid extract,
   wherein the miscella contains organic material and ash at an amount below 15 dry weight %.

2. The method of claim 1, wherein the liquid extract contains omega-3 fatty acids.

3. The method of claim 1, wherein the liquid extract contains more than 20 wt. % omega-3 fatty acids.

4. The method of claim 1, wherein microalgae included in the aqueous microalgae slurry contain less than 6 wt. % omega-3 fatty acids and the method further comprises purifying the liquid extract with a solvent to reach a liquid extract that contains more than 20 wt. % omega-3 fatty acids.

5. The method of claim 1, wherein the miscella contains at least 50 wt. % proteins.

6. The method of claim 1, wherein a volume ratio between the ethanol and the aqueous microalgae slurry is at least 5:1.

7. The method of claim 1, wherein the evaporating of the water and the ethanol comprises providing heat under vacuum to first evaporate the ethanol and then the water.

8. The method of claim 7, wherein the heat is provided from thermal waste streams.

9. The method of claim 7, wherein the heat is provided at a temperature range of 55° C.-65° C.

10. The method of claim 7, wherein the vacuum is provided at 75-125 mbar.

* * * * *